US009009814B1

(12) United States Patent
Wertz et al.

(10) Patent No.: US 9,009,814 B1
(45) Date of Patent: Apr. 14, 2015

(54) SYSTEMS AND METHODS FOR GENERATING SECURE PASSWORDS

(75) Inventors: Henry Wertz, Iowa City, IA (US); Charles Andrew Payne, Los Angeles, CA (US); Eric Wagner, Ottumwa, IA (US)

(73) Assignee: Symantec Corporation, Mountain View, CA (US)

( * ) Notice: Subject to any disclaimer, the term of this patent is extended or adjusted under 35 U.S.C. 154(b) by 349 days.

(21) Appl. No.: 13/554,614

(22) Filed: Jul. 20, 2012

Related U.S. Application Data

(60) Provisional application No. 61/510,266, filed on Jul. 21, 2011.

(51) Int. Cl.
G06F 7/04 (2006.01)
H04L 9/32 (2006.01)
G06F 21/46 (2013.01)

(52) U.S. Cl.
CPC ..................................... *G06F 21/46* (2013.01)

(58) Field of Classification Search
None
See application file for complete search history.

(56) References Cited

U.S. PATENT DOCUMENTS

| 5,465,084 | A  | * | 11/1995 | Cottrell | 340/5.27 |
| 6,542,090 | B1 | * | 4/2003  | Tadano et al. | 341/20 |
| 7,844,825 | B1 | * | 11/2010 | Neginsky | 713/184 |
| 2003/0009693 | A1 | * | 1/2003 | Brock et al. | 726/22 |
| 2004/0034801 | A1 | * | 2/2004 | Jaeger | 713/202 |
| 2006/0206918 | A1 | * | 9/2006 | McLean | 726/2 |
| 2009/0037986 | A1 | * | 2/2009 | Baker | 726/5 |
| 2011/0055585 | A1 | * | 3/2011 | Lee | 713/183 |
| 2013/0002561 | A1 | * | 1/2013 | Wakasa | 345/168 |

* cited by examiner

*Primary Examiner* — Izunna Okeke
*Assistant Examiner* — Abdulhakim Nobahar
(74) *Attorney, Agent, or Firm* — ALG Intellectual Property, LLC

(57) ABSTRACT

A computer-implemented method for generating secure passwords may include 1) displaying a user interface for entering a textual password, 2) receiving user input via the user interface to select a color for at least one character of the textual password, 3) displaying the entered textual password via the user interface by displaying the character in the selected color and by displaying at least one additional character in at least one additional color, and 4) generating a modified textual password by encoding the textual password with information relating the selected color to the character. Various other methods, systems, and computer-readable media are also disclosed.

20 Claims, 8 Drawing Sheets

SYSTEMS AND METHODS FOR GENERATING SECURE PASSWORDS

CROSS REFERENCE TO RELATED APPLICATION

This application claims priority to U.S. Provisional Application 61/510,266, titled "Colorcrypt, a method and apparatus for increasing password security via non-keyboard-entered information" and filed 21 Jul. 2011, the disclosure of which is incorporated, in its entirety, by this reference.

BACKGROUND

People increasingly rely on computing systems and services for conducting their daily affairs. Some computing systems and services may restrict user access by requiring submitting a password for access. For example, a user may establish a password with an authentication system and submit the password to the authentication system on future occasions to establish the user's identity and/or right to access computing systems and/or services.

Unfortunately, traditional password-based authentication systems may be vulnerable to attack. For example, attackers may use brute force attacks, dictionary attacks and/or other attacks to guess a user's password and gain illegitimate access to the user's account. In some examples, attackers may use keyloggers to capture a user's keystrokes, including the user's password.

Furthermore, administrators of authentication systems may require users to select passwords of a certain complexity and/or length to make certain attacks to obtain passwords more difficult. Unfortunately, these measures by administrators may make passwords more difficult for users to remember. Accordingly, the instant disclosure identifies and addresses a need for additional and improved systems and methods for generating secure passwords.

SUMMARY

As will be described in greater detail below, the instant disclosure generally relates to systems and methods for generating secure passwords by enabling and/or requiring users to add colors to one or more characters in textual passwords and encoding the textual passwords with the color information to generate more secure passwords. In one example, a computer-implemented method for generating secure passwords may include 1) displaying a user interface for entering a textual password, 2) receiving user input via the user interface to select a color for at least one character of the textual password, 3) displaying the entered textual password via the user interface by displaying the character in the selected color and by displaying at least one additional character in at least one additional color, and 4) generating a modified textual password by encoding the textual password with information relating the selected color to the character.

In some examples, the user interface for entering the textual password may be configured to receive textual input for the textual password via an input device. In these examples, the user interface may be configured to receive the user input to select the color via an additional input device distinct from the input device.

In some embodiments, the user interface may include a color palette for color selection. In these embodiments, the color palette may include a distinct figure for displaying each color within the color palette.

In one example, receiving the user input via the user interface to select the color for one or more characters of the textual password may include configuring the user interface to display subsequently entered characters for the textual password in the color until receiving an additional user input to select a different color.

In one embodiment, the computer-implemented method may further include 1) receiving a request to generate the modified textual password, 2) identifying a number of colors selected for characters of the textual password, and 3) determining that the numbers of colors exceeds a predetermined threshold. In this embodiment, generating the modified textual password may include generating the modified textual password based at least in part on determining that the number of colors exceeds the predetermined threshold.

In some examples, the computer-implemented method may further include submitting the modified textual password instead of the textual password to an authentication system. In some embodiments, the computer-implemented method may further include 1) identifying an attempt to access a resource using the textual password but not using the modified textual password, 2) determining, based on the attempt using the textual password but not using the modified textual password, that the attempt is potentially malicious, and 3) performing a remediation action based on determining that the attempt is potentially malicious. In these embodiments, performing the remediation action may include 1) sending a warning message to an account of an owner of the modified textual password, 2) sending a warning message to an administrator, 3) forcing a reset of the textual password, and/or 4) suspending an account corresponding to the modified textual password.

In one embodiment, a system for implementing the above-described method may include 1) a display module programmed to display a user interface for entering a textual password, 2) an input module programmed to receive user input via the user interface to select a color for at least one character of the textual password, 3) a coloring module programmed to display the entered textual password via the user interface by displaying the character in the selected color and by displaying at least one additional character in at least one additional color, and 4) a generation module programmed to generate a modified textual password by encoding the textual password with information relating the selected color to the character. The system may also include at least one processor configured to execute the display module, the input module, the coloring module, and the generation module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) display a user interface for entering a textual password, 2) receive user input via the user interface to select a color for at least one character of the textual password, 3) display the entered textual password via the user interface by displaying the character in the selected color and by displaying at least one additional character in at least one additional color, and 4) generate a modified textual password by encoding the textual password with information relating the selected color to the character.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
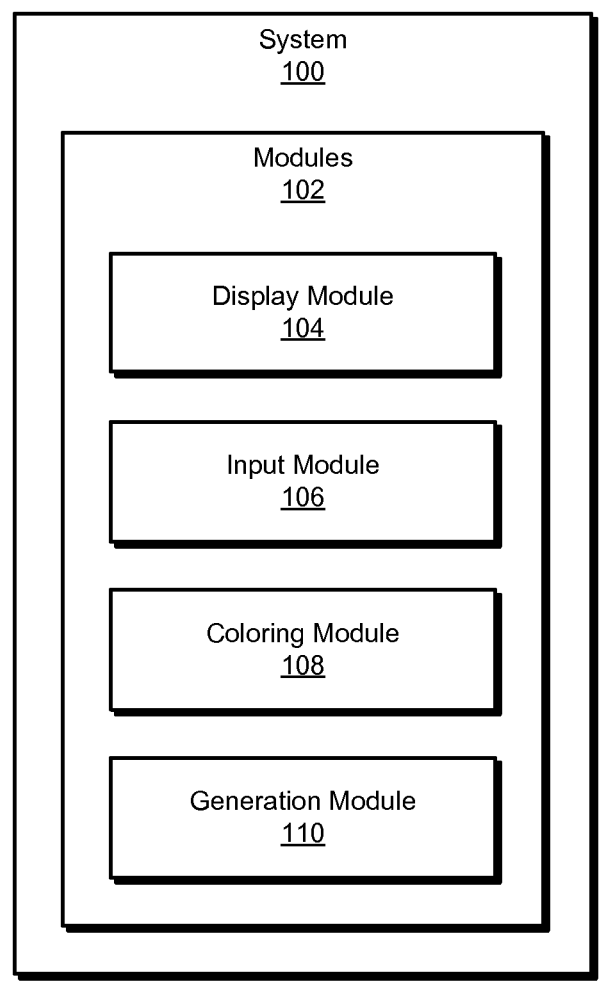
FIG. 1 is a block diagram of an exemplary system for generating secure passwords.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for generating secure passwords. As will be explained in greater detail below, by enabling and/or requiring users to add colors to one or more characters in textual passwords and encoding the textual passwords with the color information to generate more secure passwords, the systems and methods described herein may potentially improve the informational complexity of the passwords without proportionally increasing the difficulty of remembering the passwords. Additionally, in some examples, these systems may make common passwords and/or passwords that are vulnerable to dictionary attacks more robust after encoding. In some examples, these systems and methods may help to thwart keylogging attacks (e.g., by using an input device other than a keyboard to enter coloring information), and potentially also identify keylogging attacks by recognizing illegitimate attempts to use the passwords before encoding with color information. In some examples, by using differing encoding schemes across separate sites, passwords stolen from one site may be unusable for illegitimately accessing other sites.

Figure 2:
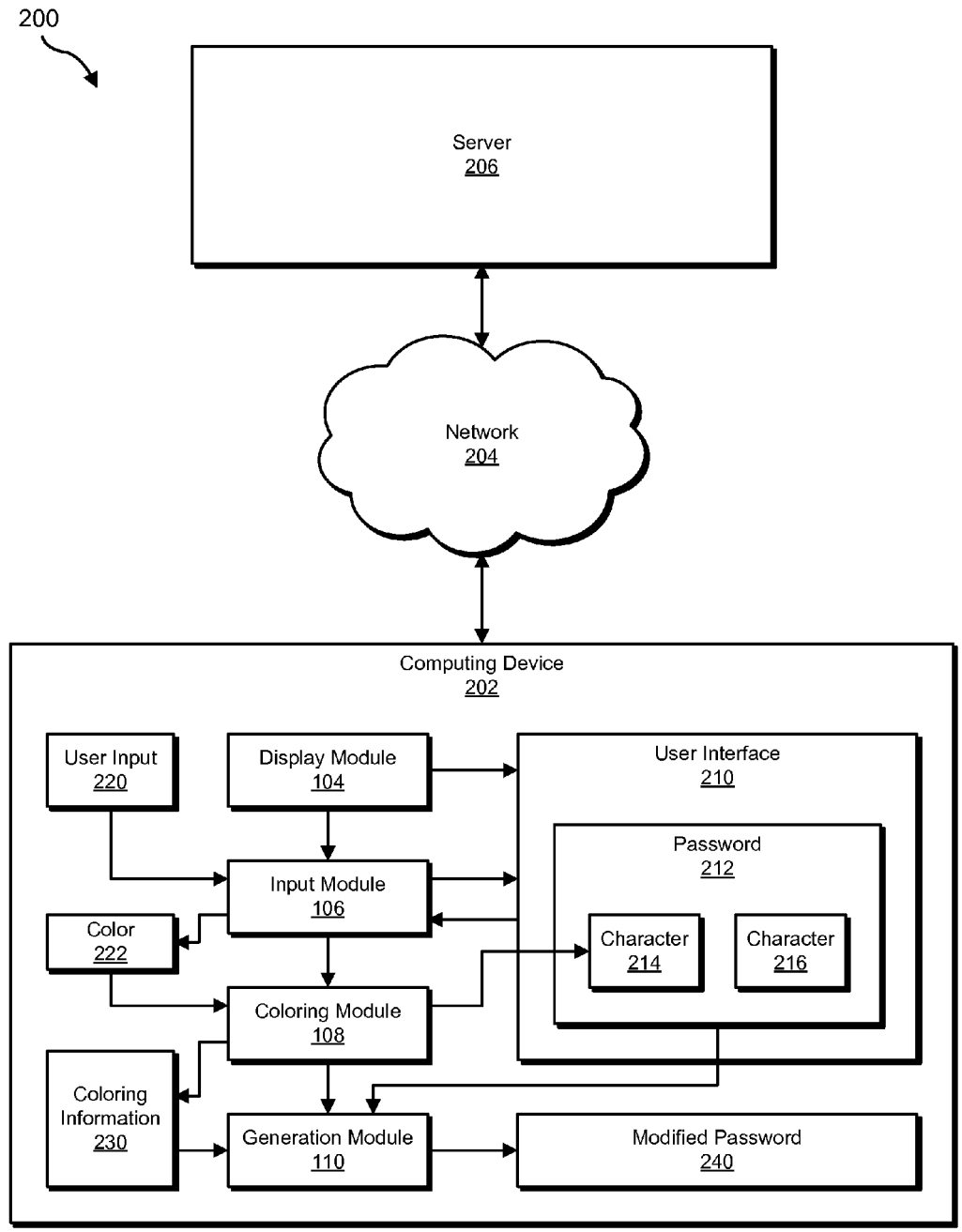
FIG. 2 is a block diagram of an exemplary system for generating secure passwords.
Figure 4:
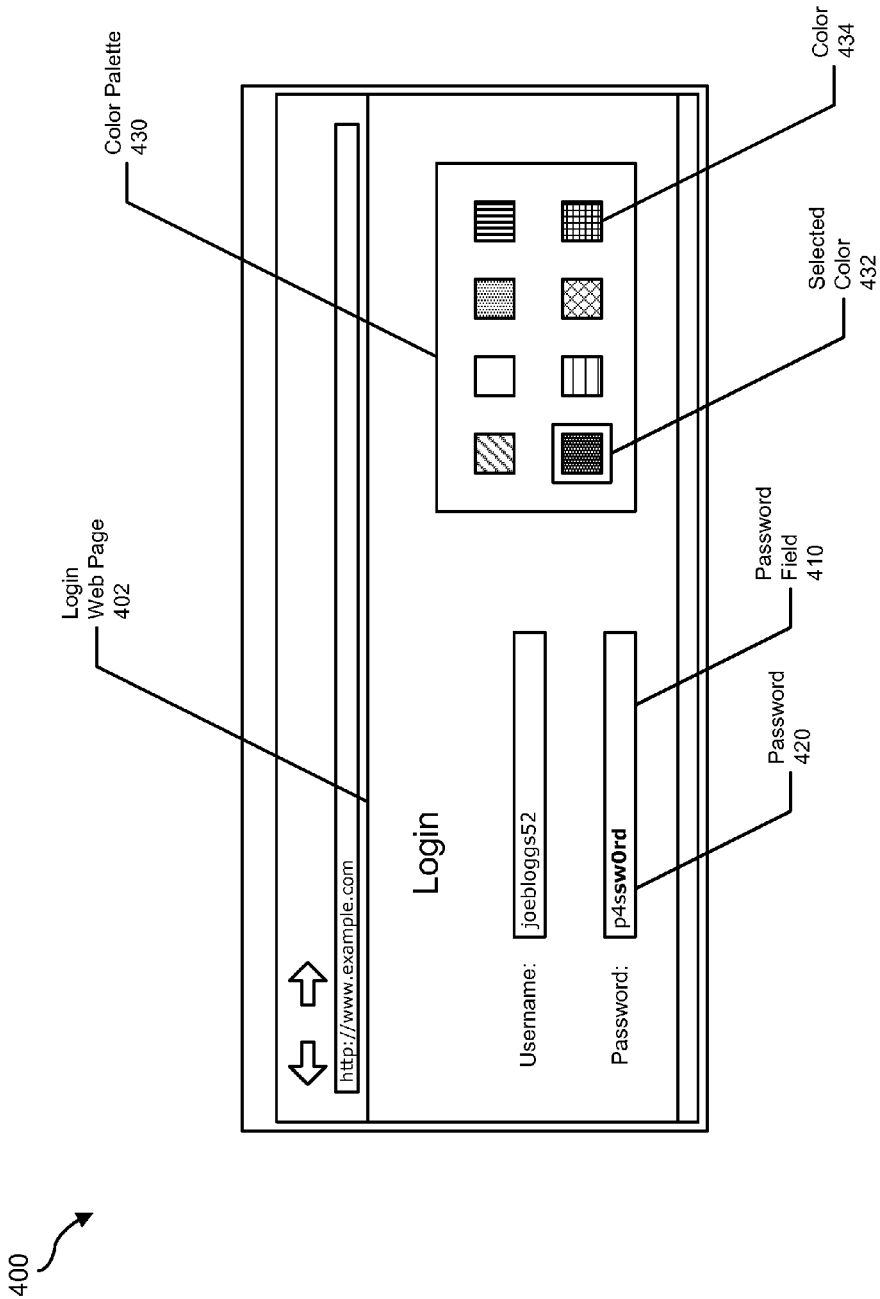
FIG. 4 is an illustration of an exemplary user interface for generating secure passwords.
Figure 5:
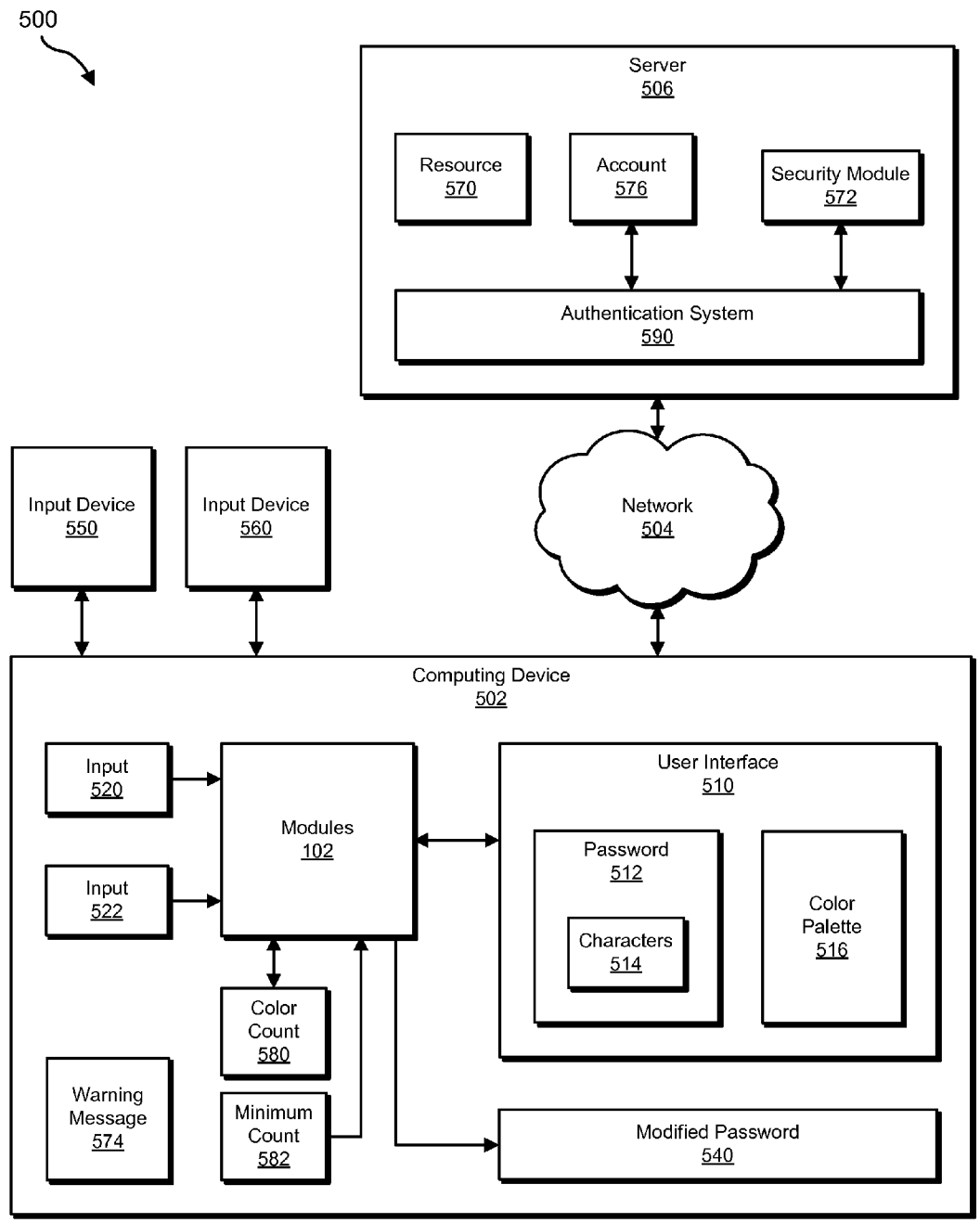
FIG. 5 is a block diagram of an exemplary system for generating secure passwords.

The following will provide, with reference to FIGS. 1, 2, and 5 detailed descriptions of exemplary systems for generating secure passwords. Detailed descriptions of corresponding computer-implemented methods will also be provided in connection with FIG. 3. Detailed descriptions of an exemplary user interface will be provided in connection with FIG. 4. Detailed descriptions of an exemplary color palette will be provided in connection with FIG. 6. In addition, corresponding detailed descriptions of an exemplary computing system and network architecture capable of implementing one or more of the embodiments described herein will be provided in connection with FIGS. 7 and 8, respectively.

FIG. 1 is a block diagram of an exemplary system 100 for generating secure passwords. As illustrated in this figure, exemplary system 100 may include one or more modules 102 for performing one or more tasks. For example, and as will be explained in greater detail below, exemplary system 100 may include a display module 104 programmed to display a user interface for entering a textual password. Exemplary system 100 may also include an input module 106 programmed to receive user input via the user interface to select a color for at least one character of the textual password.

In addition, and as will be described in greater detail below, exemplary system 100 may include a coloring module 108 programmed to display the entered textual password via the user interface by displaying the character in the selected color and by displaying at least one additional character in at least one additional color. Exemplary system 100 may also include a generation module 110 programmed to generate a modified textual password by encoding the textual password with information relating the selected color to the character. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), the devices illustrated in FIG. 5 (e.g., computing device 502 and/or server 506), computing system 710 in FIG. 7, and/or portions of exemplary network architecture 800 in FIG. 8. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102 and/or may generate all or a portion of user interface 210. Additionally or alternatively, server 206 may be programmed with one or more of modules 102 and/or may generate all or a portion of user interface 210.

In one embodiment, one or more of modules 102 from FIG. 1 may, when executed by at least one processor of computing device 202 and/or server 206, facilitate computing device 202 and/or server 206 in generating secure passwords. For example, and as will be described in greater detail below, one or more of modules 102 may cause computing device 202 and/or server 206 to 1) display a user interface 210 for entering a textual password 212, 2) receive user input 220 via user interface 210 to select a color 222 for a character 214 of password 212, 3) display the entered password 212 via user interface 210 by displaying character 214 in color 222 and by displaying a character 216 in at least one additional color, and 4) generate a modified password 240 by encoding password 212 with coloring information 230 relating color 222 to character 214.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 710 in FIG. 7, or any other suitable computing device.

Server 206 generally represents any type or form of computing device that is capable of reading computer-executable instructions. Examples of server 206 include, without limitation, application servers and database servers configured to provide various database services and/or run certain software applications. In some examples, server 206 may include an authentication system configured to accept modified password 240 and/or a resource protected by such an authentication system.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between computing device 202 and server 206.

Figure 3:
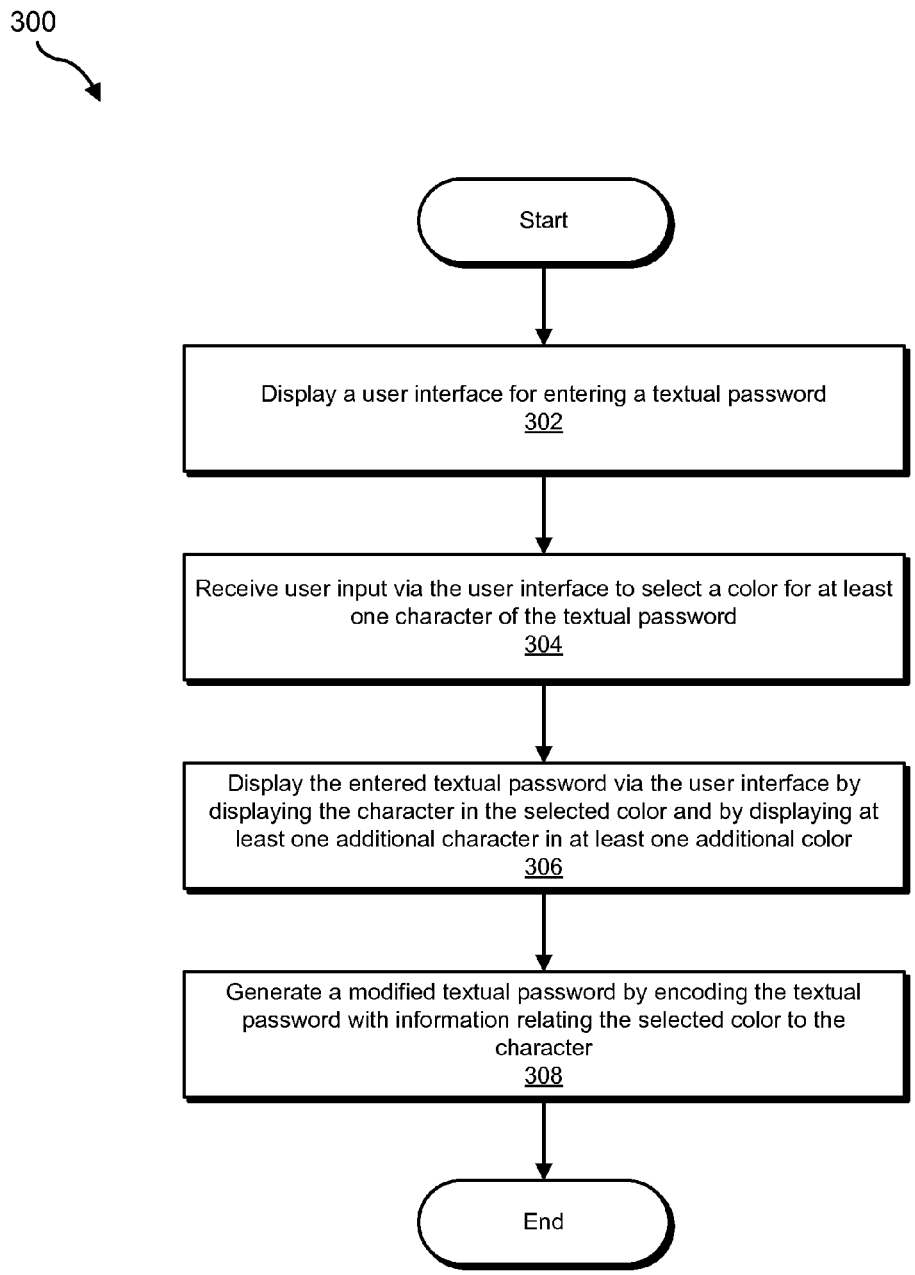
FIG. 3 is a flow diagram of an exemplary method for generating secure passwords.

FIG. 3 is a flow diagram of an exemplary computer-implemented method 300 for generating secure passwords. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may display a user interface for entering a textual password. For example, at step 302 display module 104 may, as part of computing device 202 in FIG. 2, display user interface 210 for entering password 212.

As used herein, the phrase "textual password" may refer to any combination of letters, numbers, and/or symbols. For example, the phrase "textual password" may refer to a selection of characters from a defined character set. In some examples, the phrase "textual password" may refer to such a selection of characters that are selected by, kept secret by and/or in private possession of a user. As will be described in greater detail below, in some examples one or more of the systems described herein may derive a secure password from the textual password and coloring information applied to the textual password (e.g., by a user entering the password).

As used herein, the phrase "user interface" may refer to any interface that may allow a user to interact with a computing system. In some examples, the user interface may include an interface element for entering a password (e.g., a text box). Additionally or alternatively, as will be explained in greater detail below, the user interface may include one or more colors for selecting and/or applying to the password (e.g., before and/or after entering one or more characters of the password via the user interface). In some examples, the user interface may include a web page. For example, the web page may include a web form (e.g. to enter a user name and/or password) and/or one or more interface elements for selecting colors. In some examples, the web page may include a script for applying selected colors to the password within the user interface, for recording selected colors for the password, and/or for generating a secure password from the password and the selected colors.

In some examples, the user interface for entering the textual password may be configured to receive textual input for the textual password via an input device. For example, the user interface may receive textual input for the textual password via a keyboard device. In these examples, the user interface may be configured to receive the user input to select the color via an additional input device that is distinct from the input device. For example, the user interface may be configured to receive the user input to select the color via a pointing device (e.g., a mouse). In some examples, by using a separate input device to receive the color information, the systems and methods described herein may thwart keylogging systems that capture information from one input device (e.g., a keyboard) but which do not capture information from the other input device (e.g., a mouse).

The user interface may enable and/or facilitate the selection of one or more colors for one or more characters of the textual password in any of a variety of ways. For example, the user interface may interpret certain keystrokes as a change of color. Additionally or alternatively, the user interface may place one or more interface elements adjacent to each character of the textual password for rotating the color of the corresponding character. In some examples, the user interface may include a color palette for color selection. For example, the user interface may include a row and/or grid of colors for selecting, a circle of colors for selecting, etc. In some examples, the user interface may allow for a color from the color palette to be selected (e.g., with a mouse click). Additionally or alternatively, the user interface may enable a user to drag and drop a color from the color palette (e.g., onto a character of the password). In some examples, the color palette may include a distinct figure for displaying each color within the color palette. For example, the color palette may include a variety of distinct shapes, each shape containing a different color for selecting. By portraying the colors within distinct shapes, in some examples the systems and methods described herein may facilitate the use of the systems and methods described herein where certain colors cannot be properly displayed and/or perceived (e.g., by a colorblind user).

Display module 104 may display the user interface in any suitable context. In some examples, display module 104 may operate as a part of an application for managing and/or generating passwords. Additionally or alternatively, display module 104 may operate as a part of a plug-in (e.g., of a web browser). In this example, display module 104 may display the user interface by modifying a web page for entering a password, opening a web page that includes the user interface, overlaying the user interface on a currently-viewed web page, etc. In some examples, display module 104 may display the user interface by retrieving a web page (e.g., a log-in page) from a server requiring authentication from a user.

FIG. 4 illustrates an exemplary interface 400 for generating secure passwords. As shown in FIG. 4, exemplary interface 400 may include a login web page 402. Login web page 402 may include a password field 410 for entering a password 420. Login web page 402 may also include a color palette 430 of various colors, including, e.g., a currently selected color 432. Using FIG. 4 as an example, display module 104 may display interface 400.

FIG. 5 illustrates an exemplary system 500 for generating secure passwords. As shown in FIG. 5, exemplary system 500 may include a computing device 502 in communication with a server 506 via a network 504. Using FIG. 5 as an example, display module 104 may, as a part of computing device 502, display a user interface 510 for entering a password 512. In some examples, user interface 510 may include a color palette 516. Additionally or alternatively, user interface 510 may be configured to receive an input 520 via an input device 550 (e.g., a keyboard) for entering one or more characters of password 512 and to receive an input 522 via an input device 560 (e.g., a mouse) for selecting one or more colors from color palette 516 to apply to one or more characters 514 of password 512.

Figure 6:
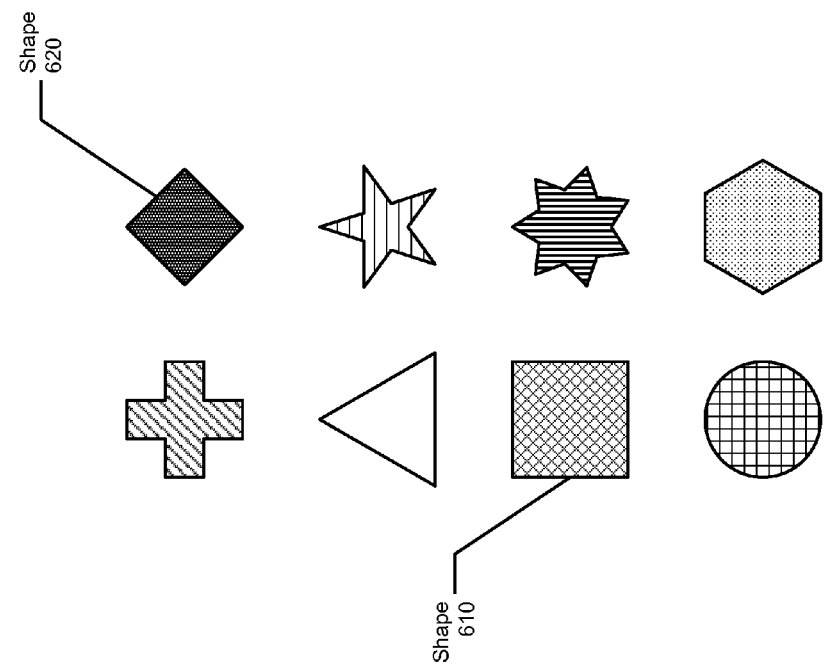
FIG. 6 is an illustration of an exemplary color palette for generating secure passwords.

FIG. 6 illustrates an exemplary color palette 600 for generating secure passwords. As shown in FIG. 6, exemplary color palette 600 may include eight distinct shapes, each filled with one of eight distinct colors. For example, color palette 600 may include a shape 610 (e.g., a green square) and a shape 620 (e.g., a brown diamond). Accordingly, a user may select shape 610 to select green for one or more characters of the password, even if the user cannot discern green from all other colors. Likewise, a user may select shape 620 to select brown for one or more characters of the password.

Returning to FIG. 3, at step 304 one or more of the systems described herein may receive user input via the user interface to select a color for at least one character of the textual password. For example, at step 304 input module 106 may, as part of computing device 202 in FIG. 2, receive user input 220 via user interface 210 to select color 222 for character 214 of password 212.

Input module 106 may receive the user input in any of a variety of contexts. In some examples, input module 106 may configure the user interface to display subsequently entered characters for the textual password in the color until receiving an additional user input to select a different color (e.g., from a color palette). In these examples, each character of the password entered may appear in the currently selected color. In some examples, input module 106 may configure the user interface to change the color of one or more characters of the password when the selected color is selected. For example, a portion of the password may be highlighted, and input module 106 may receive an input to select a color to apply to the highlighted portion of the password.

Using FIG. 4 as an example, a user may enter the first three characters of password 420 (e.g., 'p4s'). Input module 106 may then receive an input to select selected color 432, and configure interface 400 to render any additional entered characters in selected color 432 (e.g., until input module 106 receives a new input selecting a different color from color palette 430).

Using FIG. 5 as an example, input module 106 may receive input 522 via user interface 510 to select a color from color palette 516 to apply to one or more of characters 514 (e.g., before and/or after characters 514 are entered into user interface 510).

Using FIG. 6 as an example, input module 106 may receive a user input to select a color (e.g., green) by selecting shape 610 (e.g., a green square).

Returning to FIG. 3, at step 306 one or more of the systems described herein may display the entered textual password via the user interface by displaying the character in the selected color and by displaying at least one additional character in at least one additional color. For example, at step 306 coloring module 108 may, as part of computing device 202 in FIG. 2, display the entered password 212 via user interface 210 by displaying character 214 in color 222 and by displaying character 216 in at least one additional color.

Coloring module 108 may display the entered textual password in any suitable context. For example, coloring module 108 may display the entered textual password by displaying each character of the password in the currently selected color as the character is entered via the user interface. Additionally or alternatively, coloring module 108 may display the character in the selected color by modifying the color of the character to the selected color when the selected color is selected via the user interface. Likewise, coloring module 108 may display the additional character in the additional color by modifying the color of the additional character to the additional color when the additional color is selected via the user interface.

Using FIG. 4 as an example, coloring module 108 may display password 420. In one example, coloring module 108 may display password 420 in two different colors. For example, coloring module 108 may display 'p4s' in a color 434 (e.g., which may have been selected before 'p4s' was entered). Additionally coloring module 108 may display 'sw0rd' in selected color 432 (e.g., which may have been selected after 'p4s' was entered but before 'sw0rd' was entered). In one example, 'p4ssw0rd' may have been entered using color 434, and 'sw0rd' may have subsequently be highlighted in user interface 400, following which selected color 432 may have been selected, changing the highlighted portion to selected color 432.

Returning to FIG. 3, at step 308 one or more of the systems described herein may generate a modified textual password by encoding the textual password with information relating the selected color to the character. For example, at step 308 generation module 110 may, as part of computing device 202 in FIG. 2, generate modified password 240 by encoding password 212 with coloring information 230 relating color 222 to character 214.

Generation module 110 may generate the modified textual password in any of a variety of ways. For example, generation module 110 may generate the modified textual password by inserting, into the textual password, one or more characters representing each color change for subsequent colors in the textual password. For example, generation module 110 may insert an escape character and/or reserved character (e.g., not used in the textual password) and a character indicating a color. For example, a user may enter the password "USAGOLD" and select the color blue for "USA" and the color green for "GOLD". Accordingly, generation module 110 may insert "*b" representing a change to the color blue and "*g" representing a change to the color green, resulting in "*bUSA*gGOLD". In some examples, generation module 110 may not insert characters representing a color change if the first color is a default color. For example, the default color for password characters may be black, and a user may enter the password "ABCdef", selecting the color red for "def". Accordingly, generation module 110 may insert "*r" representing a change to the color red, resulting in the modified password "ABC*rdef".

In some examples, generation module 110 may generate the modified textual password by hashing the textual password with the color information (e.g., using a textual character set to represent the hash result). For example, generation module 110 may hash each character and/or string of characters with a value representing the corresponding colors. Additionally or alternatively, generation module 110 may hash the entire textual password with a value representing all color changes in the password. In some examples, generation module 110 may compress the textual password with the color information (e.g., using a textual character set to represent the compressed result). In some examples, generation module 110 may use a bijective function to map the textual password in combination with the color information onto the modified textual password. In some examples, the modified textual password may not include the same characters as the textual password. In some examples, the textual password may only be extractable from the modified textual password with a key possessed by an authentication system configured to authenticate using the modified textual password.

In some examples, generation module 110 may use an encoding scheme defined by an administrator configuration. Additionally or alternatively, generation module 110 may generate the modified textual password using an encoding scheme corresponding to an authentication system, to a server, and/or to a username.

Generation module 110 may generate the modified textual password in any of a variety of contexts. In some examples, as mentioned earlier, the user interface may include and/or be a part of a web page (and/or an interface of an application that renders the web page). In these examples, generation module 110 may store the modified textual password in a form on the web page. For example, generation module 110 may store the modified textual password in an invisible and/or hidden form on the web page.

In some examples, generation module 110 may also 1) receive a request to generate the modified textual password, 2) identify a number of colors selected for characters of the textual password, and 3) determine that the numbers of colors exceeds a predetermined threshold. In these examples, generation module 110 may generate the modified textual password based at least in part on determining that the number of colors exceeds the predetermined threshold. For example, an administrator may configure generation module 110 to require the use of at least two different colors within the textual password. As another example, an administrator may configure generation module 110 to require the use of at least three color changes within the textual password (e.g., blue-green-blue). Accordingly, if the textual password does not include minimum number of distinct colors and/or color changes, generation module 110 may display a message to a user to add more colors and/or color changes to meet the minimum requirements.

In some examples, generation module 110 may also submit the modified textual password instead of the textual password to an authentication system. For example, generation module 110 may send the modified textual password as a part of a login process. In this manner, a user may enter a relatively simple password and coloring information and submit a corresponding complex and/or obfuscated password without needing to memorize the more complex modified password.

In some embodiments, a security module may 1) identify an attempt to access a resource using the textual password but not using the modified textual password, 2) determine, based on the attempt using the textual password but not using the modified textual password, that the attempt is potentially malicious, and 3) perform a remediation action based on determining that the attempt is potentially malicious. For example, the security module may receive a message from an authentication system that the textual password was submitted for accessing a user account. In some examples, the security module may identify the correct password for the user account (e.g., the modified textual password) and derive the textual password from the modified textual password. By determining that the modified textual password is based on the textual password, the security module may determine that the submitted textual password represents the correct password before being encoded with the correct coloring information. Accordingly, the attempt may represent an illegitimate attempt (e.g., by an attacker using a keylogger). In some examples, the security module may identify the attempt to use the textual password by identify the use of an incorrectly modified textual password (e.g., encoded with incorrect coloring information). For example, security module may receive the incorrectly modified textual password and derive the textual password from the incorrectly modified textual password.

The security module may perform any of a variety of remediation actions in response to determining that the attempt to access the resource was potentially malicious. For example, the security module may sending a warning message to an account of an owner of the modified textual password (e.g., that a computing system previously used by the owner to enter the textual password has been compromised by a keylogger). Additionally or alternatively, the security module may send a warning message to an administrator (e.g., that a computing system used by the password owner has been compromised and/or that the password has been partially compromised). In some examples, the security module may force a reset of the textual password. In at least one example, the security module may suspend an account corresponding to the modified textual password.

Using FIG. 5 as an example, in some examples generation module 110 may compare a color count 580 for password 512 (e.g., a number of colors used in password 512) with a minimum count 582 for password 512 (e.g., a minimum number of colors required) and determine that color count 580 exceeds minimum count 582. Generation module 110 may accordingly generate and/or submit a modified password 540. In some examples, generation module 110 may submit modified password 540 to an authentication system 590 on server 506 (e.g., to log in to an account 576 and/or to access a resource 570). In some examples, a security module 572 may identify an attempt to access resource 570 and/or account 576 via authentication system 590 using password 512 (e.g., instead of modified password 540). In these examples, security module 572 may perform one or more remediation actions. For example, security module 572 may send a warning message 574 to a user of computing device 502 that password 512 may have been captured by a keylogger. As another example, security module 572 may force a reset of modified password 540 with account 576 (e.g., requiring the user to select a new password to replace password 512). In one example, security module 572 may suspend account 576.

As explained above, by enabling and/or requiring users to add colors to one or more characters in textual passwords and encoding the textual passwords with the color information to generate more secure passwords, the systems and methods described herein may potentially improve the informational complexity of the passwords without proportionally increasing the difficulty of remembering the passwords. Additionally, in some examples, these systems may make common passwords and/or passwords that are vulnerable to dictionary attacks more robust after encoding. In some examples, these systems and methods may help to thwart keylogging attacks (e.g., by using an input device other than a keyboard to enter coloring information), and potentially also identify keylogging attacks by recognizing illegitimate attempts to use the passwords before encoding with color information. In some examples, by using differing encoding schemes across separate sites, passwords stolen from one site may be unusable for illegitimately accessing other sites.

Figure 7:
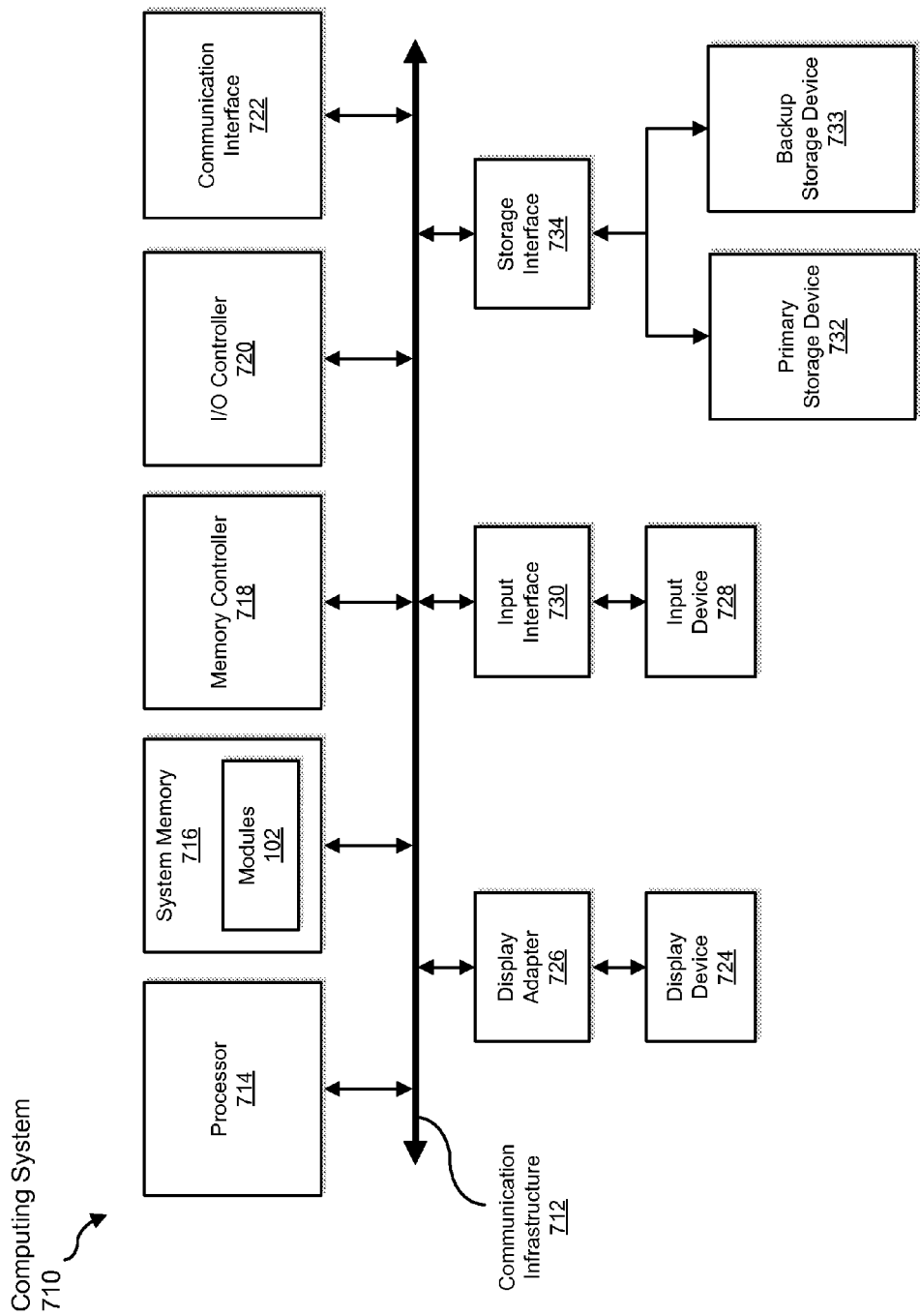
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the displaying, receiving, configuring, generating, identifying, determining, submitting, performing, sending, forcing, and suspending steps described herein. All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
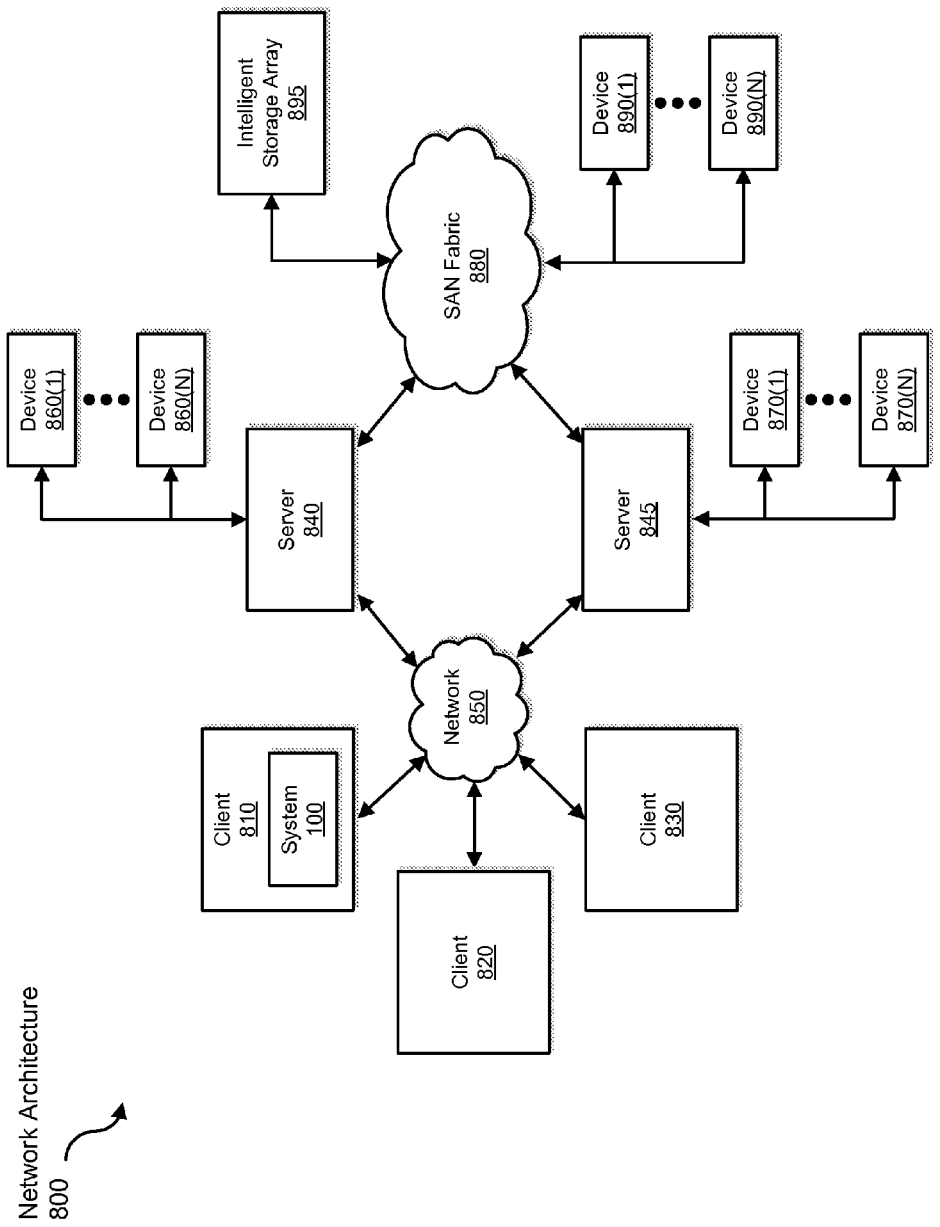
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the displaying, receiving, configuring, generating, identifying, determining, submitting, performing, sending, forcing, and suspending steps disclosed herein. All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for generating secure passwords.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a textual password to be transformed and coloring information for the textual password, transform the textual password with an encoding scheme using the coloring information, output a result of the transformation to a password field, and submit the result of the transformation to an authentication system to gain access to a resource. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for generating secure passwords, at least a portion of the method being performed by a computing device comprising at least one processor, the method comprising:
   displaying a user interface for entering a textual password;
   receiving user input via the user interface to select at least one color for at least one character of the textual password;
   displaying the entered textual password via the user interface by displaying the character in the selected color and by displaying at least one additional character in at least one additional color;
   receiving a request to generate a modified textual password that encodes the textual password with information relating the selected color to the character;
   before generating the modified password:
      identifying a number of colors selected for characters of the textual password;

determining that the number of selected colors exceeds a predetermined threshold;
generating the modified textual password in response to determining that the number of selected colors exceeds the predetermined threshold.

2. The computer-implemented method of claim 1, wherein:
the user interface for entering the textual password is configured to receive textual input for the textual password via an input device;
the user interface is configured to receive the user input to select the color via an additional input device distinct from the input device.

3. The computer-implemented method of claim 1, wherein receiving the user input for selecting the color comprises configuring the user interface to display subsequently entered characters for the textual password in the color until receiving an additional user input to select a different color.

4. The computer-implemented method of claim 1, wherein:
the user interface comprises a color palette for color selection;
the color palette comprises a distinct figure for displaying each color within the color palette.

5. The computer-implemented method of claim 1, further comprising:
identifying an attempt to access a resource using the textual password but not using the modified textual password;
determining, based on the attempt using the textual password but not using the modified textual password, that the attempt is potentially malicious;
performing a remediation action based on determining that the attempt is potentially malicious.

6. The computer-implemented method of claim 5, wherein performing the remediation action comprises at least one of:
sending a warning message to an account of an owner of the modified textual password;
sending a warning message to an administrator;
forcing a reset of the textual password;
suspending an account corresponding to the modified textual password.

7. The computer-implemented method of claim 1, further comprising submitting the modified textual password instead of the textual password to an authentication system.

8. A system for generating secure passwords, the system comprising:
a display module programmed to display a user interface for entering a textual password;
an input module programmed to receive user input via the user interface to select at least ones color for at least one character of the textual password;
a coloring module programmed to display the entered textual password via the user interface by displaying the character in the selected color and by displaying at least one additional character in at least one additional color;
a request module programmed to receive a request to generate a modified textual password that encodes the textual password with information relating the selected color to the character;
a generation module programmed to generate the modified textual password by:
before generating the modified password:
identifying a number of colors selected for characters of the textual password;
determining that the number of selected colors exceeds a predetermined threshold;
generating the modified textual password in response to determining that the number of selected colors exceeds the predetermined threshold;
at least one processor configured to execute the display module, the input module, the coloring module, the request module, and the generation module.

9. The system of claim 8, wherein:
the user interface for entering the textual password is configured to receive textual input for the textual password via an input device;
the user interface is configured to receive the user input to select the color via an additional input device distinct from the input device.

10. The system of claim 8, wherein the input module is programmed to receive the user input for selecting the color by configuring the user interface to display subsequently entered characters for the textual password in the color until receiving an additional user input to select a different color.

11. The system of claim 8, wherein:
the user interface comprises a color palette for color selection;
the color palette comprises a distinct figure for displaying each color within the color palette.

12. The system of claim 8, further comprising a security module programmed to:
identify an attempt to access a resource using the textual password but not using the modified textual password;
determine, based on the attempt using the textual password but not using the modified textual password, that the attempt is potentially malicious;
perform a remediation action based on determining that the attempt is potentially malicious.

13. The system of claim 12, wherein the security module is programmed to perform the remediation action by at least one of:
sending a warning message to an account of an owner of the modified textual password;
sending a warning message to an administrator;
forcing a reset of the textual password;
suspending an account corresponding to the modified textual password.

14. The system of claim 8, further comprising a submission module programmed to submit the modified textual password instead of the textual password to an authentication system.

15. A non-transitory computer-readable medium comprising one or more computer-executable instructions that, when executed by at least one processor of a computing device, cause the computing device to:
display a user interface for entering a textual password;
receive user input via the user interface to select at least one color for at least one character of the textual password;
display the entered textual password via the user interface by displaying the character in the selected color and by displaying at least one additional character in at least one additional color;
receive a request to generate a modified textual password that encodes the textual password with information relating the selected color to the character;
before generating the modified password:
identify a number of colors selected for characters of the textual password;
determine that the number of selected colors exceeds a predetermined threshold;
generate the modified textual password in response to determining that the number of selected colors exceeds the predetermined threshold.

16. The non-transitory computer-readable medium of claim 15, wherein:

the user interface for entering the textual password is configured to receive textual input for the textual password via an input device;

the user interface is configured to receive the user input to select the color via an additional input device distinct from the input device.

17. The non-transitory computer-readable medium of claim 15, wherein the one or more computer-executable instructions cause the computing device to receive the user input for selecting the color and thereby configure the user interface to display subsequently entered characters for the textual password in the color until receiving an additional user input to select a different color.

18. The non-transitory computer-readable medium of claim 15, wherein:

the user interface comprises a color palette for color selection;

the color palette comprises a distinct figure for displaying each color within the color palette.

19. The non-transitory computer-readable medium of claim 15, wherein the one or more computer-executable instructions further cause the computing device to:

identify an attempt to access a resource using the textual password but not using the modified textual password;

determine, based on the attempt using the textual password but not using the modified textual password, that the attempt is potentially malicious;

perform a remediation action based on determining that the attempt is potentially malicious.

20. The non-transitory computer-readable medium of claim 19, wherein the one or more computer-executable instructions cause the computing device to perform the remediation action by causing the computing device to perform at least one of:

sending a warning message to an account of an owner of the modified textual password;

sending a warning message to an administrator;

forcing a reset of the textual password;

suspending an account corresponding to the modified textual password.

* * * * *

UNITED STATES PATENT AND TRADEMARK OFFICE
CERTIFICATE OF CORRECTION

| | | |
|---|---|---|
| PATENT NO. | : 9,009,814 B1 | |
| APPLICATION NO. | : 13/554614 | |
| DATED | : April 14, 2015 | |
| INVENTOR(S) | : Henry Wertz et al. | |

It is certified that error appears in the above-identified patent and that said Letters Patent is hereby corrected as shown below:

IN THE CLAIMS

Claim 8, at column 17, lines 47 to 49, should read:
an input module programmed to receive user input via the user interface to select at least one color for at least one character of the textual password;

Signed and Sealed this
Third Day of November, 2015

Michelle K. Lee
*Director of the United States Patent and Trademark Office*